(12) United States Patent
Clements et al.

(10) Patent No.: US 6,479,593 B2
(45) Date of Patent: Nov. 12, 2002

(54) ABSORBENT POLYMER MODIFICATION

(75) Inventors: John H. Clements, Round Rock, TX (US); Howard P. Klein, Austin, TX (US); Edward T. Marquis, Austin, TX (US); James R. Machac, Jr., Lago Vista, TX (US); Katty Darragas, Oudenaarde (BE)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/950,147

(22) Filed: Sep. 10, 2001

(65) Prior Publication Data

US 2002/0151432 A1 Oct. 17, 2002

Related U.S. Application Data

(60) Provisional application No. 60/298,447, filed on Jun. 15, 2001, and provisional application No. 60/266,540, filed on Feb. 6, 2001.

(51) Int. Cl.[7] ............................................. C08F 120/02
(52) U.S. Cl. ...................... 525/329.7; 528/271; 525/63; 525/80; 525/330.2; 522/1; 522/71; 522/81; 522/83; 522/84; 522/179
(58) Field of Search ............................. 528/271; 525/63, 525/80, 329.7, 330.2; 522/1, 71, 81, 83, 84, 179

(56) References Cited

U.S. PATENT DOCUMENTS

| | | | |
|---|---|---|---|
| 5,314,420 A | * 5/1994 | Smith et al. | 210/691 |
| 5,409,771 A | 4/1995 | Dahmen et al. | 428/327 |
| 6,150,582 A | 11/2000 | Wada et al. | 604/372 |

* cited by examiner

Primary Examiner—Samuel A. Acquah
(74) Attorney, Agent, or Firm—Russ R. Stolle; Ron D. Brown; Christopher J. Whewell

(57) ABSTRACT

Provided herein are cross-linked super absorbing polymers made by reacting a copolymer having an esterifiable acid group with a cyclic alkylene carbonate. The resulting cross-linked materials have an increased ability to retain absorbed liquids even under the influence of applied stress. Catalysts are also disclosed which are useful in promoting the reaction between the alkylene carbonate and copolymer.

19 Claims, 1 Drawing Sheet

ABSORBENT POLYMER MODIFICATION

CROSS REFERENCES TO RELATED APPLICATIONS

This application claims the benefit of U.S. Provisional Application No. 60/298,447 filed Jun. 15, 2001 and U.S. Provisional Application No. 60/266,540 filed Feb. 6, 2001 which are currently still pending.

FIELD OF THE INVENTION

This invention relates to absorbent compositions of matter, specifically absorbent polymeric compositions of matter which are capable of absorbing large amounts of aqueous fluids. In particular, the invention relates to methods for chemically altering absorbent polymeric compositions to increase their ability to retain absorbed fluids even when subjected to physical stress, and the modified polymeric products produced by such methods. Final articles of manufacture having enhanced absorbency characteristics are provided.

BACKGROUND

The employment of various articles of manufacture to absorb a wide range of fluids in instances where fluids are encountered are well known in the art. Such known articles include diapers for infants and toddlers, incontinence garments, sanitary napkins, wound dressings, and emergency spill clean-up pads, to name but a few. Such articles typically comprise the absorbent material, and a suitable carrier structure ancillary to the absorbent useful for positioning and maintaining the absorbent in a location most conducive to the maximized efficient absorption of the liquid substance to be controlled. Often, the carrier structure comprises multi-layer film composites of varied configurations and having adhesive portions which assists in the affixation of the article as a whole to a portion of a person's body, or other desired physical location.

Many polymeric and non-polymeric materials are known in the art as being useful as adsorbents for aqueous fluids. Perhaps the most notable of the suitable materials are those often referred to as "super-absorbing polymers" or "SAPs" by those skilled in the art. Superabsorbents which are commercially available are cross-linked polyacrylic acids or cross-linked starch-acrylic-acid-graft-copolymers, the carboxyl groups of which are partially neutralized with a hydroxide of sodium or potassium. U.S. Pat. No. 5,409,771 of Dahmen et al. (the entire contents of which are herein incorporated by reference thereto) describes such superabsorbents. Typically, these materials can absorb many times their its weight in water and other aqueous solutions. The most preferred method of preparation of these materials involves the free-radical copolymerization of acrylic acid with a multifunctional crosslinking agent, such as trimethylolpropane triacrylate. Once produced, the polymer gel is then partially ionized by addition of alkali hydroxide, dried, and ground into a fine powder. In such form, the material may absorb 40 to 1000 times its weight in aqueous liquids.

One negative effect observed in connection with the use of such absorbing polymers is that retention of absorbed fluid is severely reduced on exposure of the moisture-swollen gel to an externally-applied weight or other force, such as when a urine-laden diaper is subjected to the forces encountered by the sitting action of a child to whom such diaper is affixed, to the extent that aqueous fluid may be caused to exude from the superabsorbent. Such exudation represents a significant drawback in the performance of such materials in sanitary articles, and there thus exists a need for further modification of these materials towards improving fluid retention when placed under stress.

One method known in the art for further modifying cross-linked acrylic acid copolymers involves esterification of the acrylic acid repeating units by reaction with diols, thereby further crosslinking the material according to the scheme:

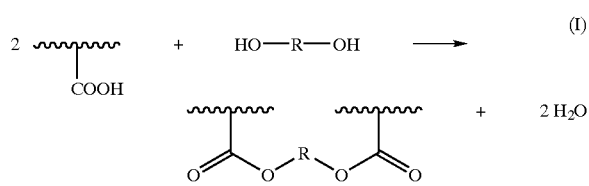

A diol which is commonly preferred for such esterification is 1,4-butanediol. However, when using 1,4-butanediol for such reactions, the reaction temperature required (c.a. 190° C.) results in partial degradation of the polymer. Additionally, unacceptably high amounts of free unreacted diol remain after the reaction has been performed.

One desirable substitute for 1,4-butanediol in the esterification of cross-linked acrylic acid copolymers per the above are cyclic alkylene carbonates. The prior art U.S. Pat. No. 5,409,771 describes the use of alkylene carbonates in just such an employment. However, according to the invention claimed therein, temperatures of at least 150 degrees centigrade (and more preferably 180° C. to 250° C.) are required to effectuate the desired reaction. Unfortunately, partial degradation of the material desired to be produced is observed when using temperatures within these ranges. Thus, if there were a method for esterifying cross-linked acrylic acid copolymer superabsorbents without degrading the desired product, such a method would beneficially provide increased product yields and a product of overall higher quality than those currently available. Further, if such esterification could be conducted at lower temperatures using environmentally-friendly, biodegradable materials, such would be an advance in this art.

SUMMARY OF THE INVENTION

The present invention provides a process for providing an esterified copolymer useful as a super absorbent comprising the steps of 1) providing a copolymer having an esterifiable acid group; 2) providing (optionally) an alcohol; 3) providing water; 4) providing a esterification agent (an alkylene carbonate or polyol); 5) providing a catalyst; 6) mixing said copolymer, alcohol, optional water, esterification agent, and catalyst to form a mixture; and 7) heating said mixture to a temperature sufficient to cause esterification of said esterifiable acid group with said esterification agent.

Preferred catalysts useful in the invention are polyethers of the formula:

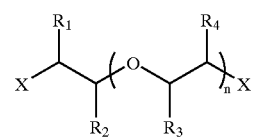

having molecular weights of at least about 400 and wherein X is selected from the group consisting of: hydroxy and $C_1$–$C_6$ alkoxy, straight chain or branched, but is preferably methoxy when an alkoxy is selected; and $R_1$, $R_2$, $R_3$, and $R_4$ are each independently selected from the group consisting of: hydrogen, methyl, or ethyl; and n is any integer between 9 and 15,000.

DETAILED DESCRIPTION

Figure 1:
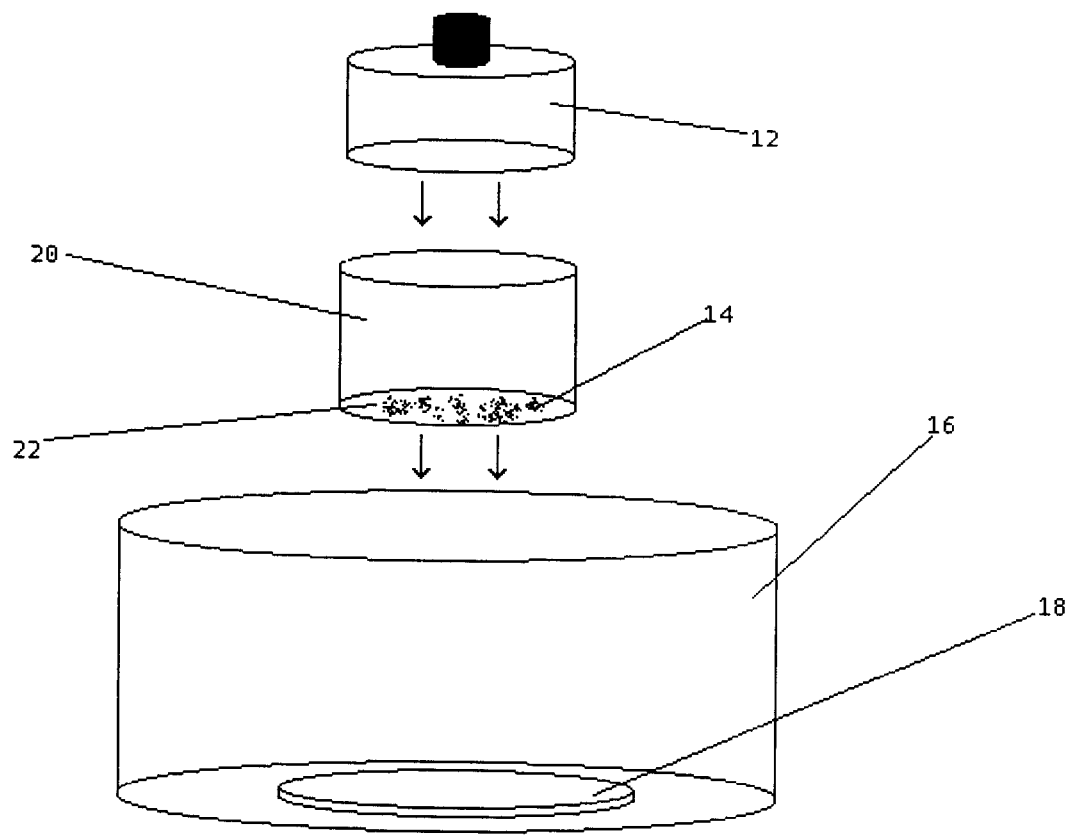
FIG. 1 is a schematic representation of the apparatus used to measure the AAP of various super-absorbing polymers provided in accordance with the invention and those of prior art.

One aspect of the present invention is the modification of cross-linked acrylic acid and other copolymer superabsorbents by reaction with esterification agents which comprise cyclic alkylene carbonates at temperatures below those at which degradation of the copolymer occurs. We have discovered that certain materials behave catalytically towards promoting esterifications using the esterification agents according to the invention. Since the copolymer materials resulting from the modification are likely to come into close contact with human subjects, only those materials which are non-toxic as catalysts are especially favored.

According to the invention, it has been discovered that certain inorganic salts, particularly the carbonates of alkali metals such potassium and sodium, function as catalysts in the esterification of acrylic acid copolymer superabsorbents with esterification agents.

According to the invention, we have also discovered that certain polyethers, particularly poly(ethylene glycol) and poly(ethylene oxide) polyethers having molecular weights of at least 400, function as catalysts in the esterification of acrylic acid copolymer superabsorbents with esterification agents as taught herein. Such materials may be hydroxy-terminated or alkoxy-terminated.

According to one preferred form of the invention, the polymer to be modified is mixed with components selected from: esterification agent, water, ethanol (optionally), and catalyst. Each component may be present in any amount between 0.50% and 5.00% (by weight) of the weight of the resulting mixture, and the amount of polymer comprises any amount between 85.00% and 99.50% (wt.) of the resulting mixture, prior to being heated to effect transesterification. Unless otherwise specified, all parts and percentages in this specification and the appended claims are expressed in terms of weight.

Although not binding this specification or the appended claims to any particular theory, it is suspected that the acrylic acid repeating units of the polymer undergo alkoxylation in the cases where a cyclic carbonate is used as the esterification agent, thereby producing a hydroxyalkylester which can further participate in reaction with additional acrylic acid units according to the scheme:

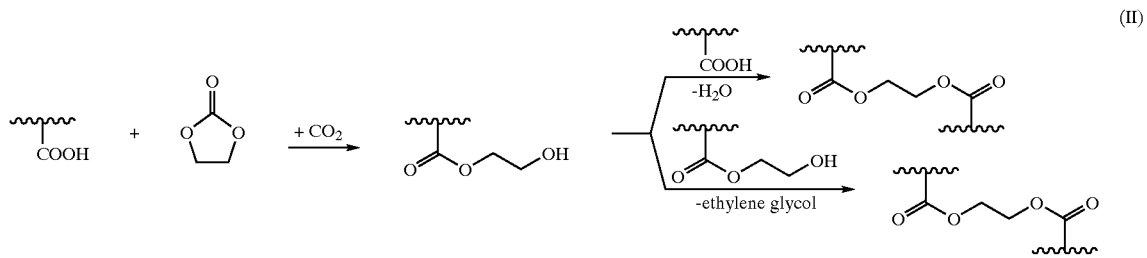

(II)

Through such a mechanism, the resulting crosslink is the diester shown in reaction (1) above in which the identity of R is dictated by the particular cyclic alkylene carbonate selected. In such a reaction as (II), in which there is a esterification of a hydroxyalkylester intermediate, or in a reaction according to (III) below in which there occurs hydrolysis of the cyclic carbonate:

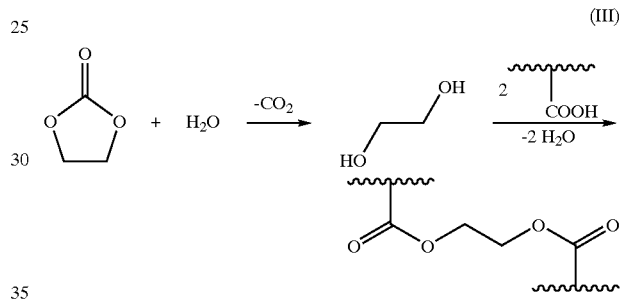

(III)

there is glycol produced, which may also participate in the crosslinking of the copolymer.

According to one form of the invention, the copolymer to be modified is mixed with water, ethanol, esterification agent (cyclic alkylene carbonate), and catalyst and heated to a temperature sufficient to cause the crosslinking of the copolymer with the cyclic alkylene carbonate. The presence of the catalyst enables the reaction to proceed to the desired extent of esterification without any attendant degradation of the product, in contrast to methods used in the prior art, because of the lowering of the reaction's activation energy, and hence temperature required for reaction, by virtue of the presence of the catalyst.

Suitable catalysts useful in accordance with the invention include the polymeric materials: poly(ethylene glycol), poly(ethylene oxide), poly(propylene glycol), poly(propylene oxide), polyether carbonates, and any mixture of two or more of the foregoing. Especially preferred catalysts useful in accordance with the invention are the polyethers having molecular weights greater than about 400, and which are hydroxy or alkoxy terminated, that are represented by the formula:

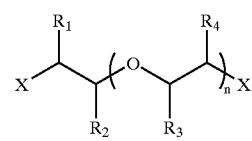

wherein X may be selected from the group consisting of: hydroxy and $C_1$–$C_6$ alkoxy, straight chain or branched, but is preferably methoxy when an alkoxy is selected; and $R_1$, $R_2$, $R_3$, and $R_4$ are each independently selected from the group consisting of: hydrogen, methyl, or ethyl; and n is any integer between 9 and 15,000. Preferably, the value of n is selected to enable the polymeric catalyst to dissolve in mixtures of water, ethanol, and alkylene carbonate, which values of n are most preferably between about 50 and 3000, including every integer therebetween. Additional catalysts suitable for use in the inventive process are polyalkoxy polymers derived from ethylene oxide, propylene oxide, ethylene glycol, propylene glycol, and alkoxides such as sodium t-butoxide and sodium methoxide. Inorganic carbonates, including without limitation such as the carbonates of sodium, potassium, and lithium, and the bicarbonates of each of these metals, are also suitable catalysts for use in the present invention. Inorganic hydroxides, including without limitation such as those of sodium, potassium, lithium, calcium, magnesium, and strontium are also suitable as catalysts for use in the present invention. Acetate salts, including without limitation the acetates of sodium, potassium, and zinc. Crown ethers such as 18-crown-6 and 15-crown-5 are also suitable catalysts within the context of the invention.

Suitable esterification agents according to the invention include, without limitation, alkylene carbonates (containing either 5-membered or 6-membered rings) having any number of carbon atoms between 3 and 12, including 3 and 12, ethylene carbonate, propylene carbonate, butylene carbonate, glycerine carbonate, ethylene glycol, propylene glycol, diethylene glycol, triethylene glycol, glycerine, the 6-membered carbonates including those such as: 1,3-dioxan-2-one; 4-methyl-1,3-dioxan-2-one; 5-methyl-1,3-dioxan-2-one; etc. Ethylene carbonate is an especially preferred esterification agent. The preferred amount of alkylene carbonate in the reaction mixture is any amount between 0.50 and 5.00% by weight based upon the total weight of the reaction composition, including every hundredth percentage therebetween.

In a preferred form of the invention, water is present in the reaction mixture when the esterification agent is selected to be an alkylene carbonate, for the purpose of promoting carbonate hydrolysis and to provide better mixing of carbonate with polymer. The preferred amount of water in a reaction mixture when water is present is any amount between 0.50% and 10.00% by weight based upon the total weight of the reaction composition, including every hundredth percentage therebetween. When the esterification agent is selected to be a polyol, water is not an essential ingredient, but may be present to assist with handling of the material my lowering its viscosity.

A reaction mixture according to an alternate form of the invention comprises a compatabilizing amount of an alcohol. It is preferred that the alcohol be substantially water soluble, and for inclusion in the reaction mixture of the invention, any alcohol which confers homogeneity upon the reaction mixture following its addition is suitable for use in the present invention. Preferred alcohols include: ethanol, n-propanol, isopropanol, n-butanol, and sec-butanol. The preferred amount of alcohol in a reaction mixture according to an alternate embodiment is any amount between 0.50% and 10.00% by weight based upon the total weight of the reaction mixture, including every hundredth percentage therebetween.

It was initially thought from reading various references in the prior art that heating temperatures of at least 150° C., the minimum taught in U.S. Pat. No. 5,409,771, would be required in any case to produce a product that could effectively perform well in comparison to the super-absorbing polymers of commerce and the prior art. However, this was unexpectedly found to not be the case when super absorbing polymers are made according to the present invention. By increasing the amount of water and alkylene carbonate used in the reaction mixture when an alkylene carbonate is selected as the esterification agent, finished products with performances superior to those discussed in U.S. Pat. No. 5,409,771 have been prepared.

We discovered that increasing the amount of water employed in the formulation from 3 to 6 g per 100 g base polymer resulted in dramatic increases in absorbency against pressure ("AAP") performance. An increase from 24.49 (example 13, below) to 33.85 (example 14) was observed for materials that were heated to 145° C. and in the absence of a catalyst. Further, the presence of our catalysts were found to increase the AAP performance of "low-water" formulations (i.e. 3 g water per 100 g base polymer) by as much as 16%, with methoxy-terminated poly(ethylene glycol) showing the greatest improvement. However, no catalytic enhancement of AAP performance was observed for "high-water" formulations (i.e. 6 g water per 100 g base polymer). It was also found that the AAP performance of "high-water" formulations containing no catalyst was enhanced only slightly (8.2%) by raising the temperature of during the heating from 145° to 180° C., as evident from comparing the performance of the materials prepared using examples 15 and 17. The temperature range at which a reaction according to the invention may be carried out is any temperature in the range of between 80° C. and 150° C., and is preferably any temperature in the range of 125–145° C. Preferably, the pressure is atmospheric, although super-atmospheric and sub-atmospheric pressures may be used.

Performance of the materials prepared in accordance with the various methods have been assessed using the following testing procedures: (1) free-swell capacity ("FSC"), defined as the amount in grams of an aqueous 0.900% NaCl solution absorbed per gram of SAP upon immersion of said SAP in the liquid for 30 minutes; (2) centrifuge retention capacity ("CRC"), defined as the amount in grams of an aqueous 0.900% NaCl solution absorbed per gram of SAP upon immersion of said SAP in the liquid for 30 minutes followed by the application of a centrifugal force equal to 2452.5 m/s$^2$ (250.0 G) for 3 minutes; (3) absorbency against pressure ("AAP"), defined as the amount in grams of an aqueous 0.900% NaCl solution absorbed per gram of SAP over a 1 hour period while under a weight exerting a pressure of 21.0 g/cm$^2$. Similar test procedures 440.1–99, 441.1–99 442.1–99, respectively, relate to these tests and are well-known in the art, and are published by EDANA, Avenue Eugène Plasky, 157, 1030 Brussels-Belgium, which are herein incorporated by reference thereto. All tests were performed at least twice with the average value reported for greater accuracy.

The absorbing properties of each SAP have been quantified by an experiment that measures the absorbency of the polymer against an external pressure (AAP) using an apparatus as shown in FIG. 1, to which the reader's attention is now directed. To conduct an evaluation, a quantity of 0.9000 g of SAP sample 14 is weighed and spread evenly over the stainless steel mesh (400 grade) 22 bottom of an open-ended plexiglas cylinder 20, which is 6.0 cm in diameter. A plexiglas piston and weight assembly 12 weighing a total of 574.0 g was then slid into position, resting on the mesh bottom 22 such that a downward force equal to 21.0 g/cm$^2$ was exerted on the SAP sample 14. At this point, the completed assembly comprising cylinder 20, mesh 22, sample 14, and piston and weight 12 was weighed. This assembly was then placed onto a piece of filter paper (not shown) resting atop a circular plexiglas base 18, however, prior to such placement of the assembly, the base was placed at the center of a small reservoir 16 filled with a 0.900% wt. NaCl aqueous solution (saline solution) such that the liquid level barely covered the base and filter paper, thoroughly wetting it as shown in FIG. 1. The apparatus was allowed to rest atop the base for 1 hour as the SAP absorbed liquid. At this time, the assembly comprising cylinder 20, mesh 22, sample 14, and piston and weight 12 was removed from the liquid and weighed. The difference between the final and initial weight of the assembly divided by the weight of dry SAP used was recorded as the polymer's AAP.

The present inventors do not intend that any theoretical concepts put forth by them should be considered limiting of the present invention, as the true chemical mechanisms for the chemical changes described in this Specification are little-understood. Theoretical concepts, when set forth, are provided only as potential operatives of true events. The following examples are not to be construed as delimitive of the invention:

catalyst. Solution "A" was added to 100.00 g of dry absorbing polymer (courtesy Industrial Chemicals) in a pint-sized, wide-mouth glass jar followed by vigorous shaking of the mixture until homogeneous mixing was achieved. Solution "B" was then added to the resulting mixture, which was again shaken until homogeneous mixing was achieved. This was placed in an oven with the lid removed and allowed to react. The hot, dry powder obtained was then removed from the oven, sealed with lid, and allowed to cool. The cooled material was ground into a fine powder via mortar and pestle to obtain the finished product in final form. Note that this method differs from Method 1 in that its use is often required when employing highly water-soluble catalysts such as alkoxide salts that will not dissolve in aqueous mixtures of ethylene carbonate and ethanol.

Table I contains performance data for the various formulations prepared according to the above methods.

TABLE I

Performance data for polymers modified according to methods 1 and 2.

| Example # | Method Used | Amt. (g) per 100 g base SAP | | | | Baking Conditions | | Performance | | |
|---|---|---|---|---|---|---|---|---|---|---|
| | | EC | Water | Ethanol | Catalyst | Time (hrs) | Temp (° C.) | FSC | CRC | AAP |
| 1 | 1 | 1.9 | 1.9 | 1.9 | 0.7$^a$ | 2.0 | 150 | 47.8 | 33.6 | 20.23 |
| 2 | 1 | 1.9 | 1.9 | 1.9 | 0.6$^b$ | 2.0 | 150 | 48.7 | 35.9 | 18.10 |
| 3 | 2 | 1.9 | 2.0 | 1.9 | 0.6$^c$ | 2.0 | 150 | 50.8 | 36.1 | 16.31 |
| 4 | 1 | 1.9 | 1.9 | 0 | 0.7$^a$ | 2.0 | 150 | 50.7 | 35.2 | 17.35 |
| 5 | 1 | 1.9 | 1.9 | 0 | 0.7$^b$ | 2.0 | 150 | 48.5 | 35.2 | 16.22 |
| 6 | 2 | 1.9 | 1.9 | 0 | 0.7$^c$ | 2.0 | 150 | 48.5 | 33.1 | 18.76 |
| 7 | 1 | 1.9 | 2.0 | 1.9 | 0.7$^a$ | 1.0 | 180 | 48.9 | 34.4 | 23.16 |
| 8 | 1 | 1.9 | 1.9 | 2.0 | 0.7$^b$ | 1.0 | 180 | 50.2 | 33.6 | 22.78 |
| 9 | 2 | 1.9 | 1.9 | 1.9 | 0.7$^c$ | 1.0 | 180 | 50.4 | 32.7 | 23.82 |
| 10 | Unaltered base SAP | | | | | | | 49.14 | 32.60 | 16.29 |
| 11 | AP70 | | | | | | | 44.80 | 28.83 | 31.53 |

$^a)$Hydroxy-terminated Poly(ethylene glycol) with Mn ~ 1500, catalog number 20,243-6 available from Aldrich Chemical Co., Milwaukee, Wisconsin;
$^b)$Methoxy-terminated Poly(ethylene glycol) with $M_n$ ~ 1000, catalog number 44,589-4 available from Aldrich Chemical Co. of Milwaukee, Wisconsin;
$^c)$sodium carbonate.

EXAMPLES 1–11

Method 1

A solution consisting of ethylene carbonate (Huntsman brand JEFFSOL® EC), water, ethanol, and catalyst was prepared and added to 100.00 g of dry absorbing polymer (courtesy Industrial Chemicals) in a pint-sized, wide-mouth glass jar. Vigorous shaking of the mixture was sufficient to obtain a homogeneous wet powder. This was then placed in an oven with the lid removed and allowed to react. The hot, dry powder obtained was then removed from the oven, sealed with lid, and allowed to cool. The cooled material was ground into a fine powder via mortar and pestle to obtain the finished product in final form.

Method 2

A solution labeled "A" was prepared by mixing ethylene carbonate (Huntsman brand JEFFSOL® EC) with ethanol. A solution labeled "B" was prepared by mixing water with For comparative purposes, examples 10 and 11 are control materials. Example 10 refers to the unaltered SAP courtesy of Industrial Chemicals and example 11 is a commercially available SAP modified according to the art disclosed in U.S. Pat. No. 5,409,771 (courtesy Stockhausen). In the above data table and in subsequent tables, the results of the Free-Swell Capacity, Centrifuge Retention Capacity, and Absorbency Against Pressure tests are reported as grams of absorbed liquid per gram of SAP. It is noteworthy that modification of the Industrial Chemicals material according to the present invention does not significantly alter the performance as measured by the Free-Swell Capacity and Centrifuge Retention Capacity. In contrast, the performance as measured by Absorption Against Pressure is much improved over the base polymer. However, the performance is still considerably lower than that documented in U.S. Pat. No. 5,409,771.

EXAMPLES 12–28

Method 3

Ethylene carbonate (Huntsman brand JEFFSOL® EC), water, and catalyst were mixed to form a homogeneous solution. 50.00 g of dry absorbing polymer (courtesy Industrial Chemicals) was placed into a 300 cc Black and Decker HandyShortcut II household chopper. To this was added the above solution and the mixture blended for 30–45 seconds until all additives had been equally dispersed throughout the material. The resulting blend was placed into a half-pint wide-mouth glass jar and heated in an oven preheated to 145° C. for 2.5 hours at which time the jar containing the heated product was removed, sealed, and allowed to cool. The cooled material was broken into small granules with the aid of the chopper to obtain the finished product in final form.

Table II contains performance data for the various formulations prepared according to the above method.

TABLE II

Performance data for polymers modified according to method 3.

| Example # | Amt. (g) per 100 g base SAP | | | Baking Conditions | | Performance | | |
|---|---|---|---|---|---|---|---|---|
| | EC | Water | Catalyst | Time (hrs) | Temp (° C.) | FSC | CRC | AAP |
| 12 | 2.0 | 3.0 | 0 | 2.5 | 145 | — | — | 22.64 |
| 13 | 3.0 | 3.0 | 0 | 2.5 | 145 | 50.11 | 36.22 | 24.49 |
| 14 | 3.0 | 6.0 | 0 | 2.5 | 145 | 49.28 | 32.54 | 33.85 |
| 15 | 3.0 | 6.0 | 0 | 2.0 | 145 | 49.39 | 33.52 | 31.28 |
| 16 | 3.0 | 6.0 | 0 | 1.0 | 145 | 48.28 | 32.59 | 25.77 |
| 17 | 3.0 | 6.0 | 0 | 2.0 | 180 | 44.70 | 26.03 | 33.84 |
| 18 | 0.0 | 3.1 | 1.0[a] | 2.5 | 145 | 52.36 | 37.29 | 19.46 |
| 19 | 3.0 | 0 | 1.0[a] | 2.5 | 145 | — | — | 21.47 |
| 20 | 2.0 | 3.0 | 1.0[a] | 2.5 | 145 | — | — | 22.18 |
| 21 | 2.1 | 3.0 | 2.0[a] | 2.5 | 145 | — | — | 22.53 |
| 22 | 3.1 | 3.0 | 2.0[a] | 2.5 | 145 | 53.74 | 35.66 | 23.96 |
| 23 | 3.0 | 3.0 | 1.0[a] | 2.5 | 145 | 50.79 | 35.84 | 28.35 |
| 24 | 3.0 | 6.0 | 1.0[a] | 2.5 | 145 | 51.31 | 33.83 | 30.21 |
| 25 | 3.0 | 6.0 | 1.0[b] | 2.5 | 145 | 51.35 | 35.30 | 26.78 |
| 26 | 3.0 | 3.0 | 1.0[c] | 2.5 | 145 | 49.48 | 35.10 | 27.78 |
| 27 | 3.0 | 6.0 | 1.0[d] | 2.5 | 145 | 50.44 | 33.15 | 35.08 |
| 28 | 3.0 | 3.0 | 1.0[e] | 2.5 | 145 | 51.94 | 35.80 | 31.04 |
| 10 | Unaltered base SAP | | | | | 49.14 | 32.60 | 16.29 |
| 11 | AP70 | | | | | 44.80 | 28.83 | 31.53 |

[a] Methoxy-terminated Poly(ethylene glycol) with $M_n \sim 1000$, catalog number 44,589-4 available from Aldrich Chemical Co. of Milwaukee, Wisconsin;
[b] zinc acetate;
[c] Hydroxy-terminated Poly(ethylene glycol) with $M_n \sim 1500$, catalog number 20,243-6 available from Aldrich Chemical Co., Milwaukee, Wisconsin;
[d] sodium acetate;
[e] sodium ethoxide.

One aspect of the present invention is the modification of super-absorbing polymers (SAP's) by reaction with hydroxy-functional alkylene carbonates, specifically, glycerine carbonate, at temperatures below 150° C. with or without the aid of catalysts. Yet another aspect of the present invention is the reaction of glycerine in lieu of glycerine carbonate under similar conditions, optionally in the absence of water. Glycerine and glycerine carbonate are both suitable as esterification agents according to the invention. Modification of super-absorbing polymers according to the invention using glycerine as esterification agent produces a material with absorbing properties that are slightly better than those observed when using the significantly more costly glycerine carbonate as active. Like ethylene carbonate, glycerine carbonate requires the presence of water in the formulation, presumably to promote hydrolysis of the carbonate to glycerine wherein an esterification crosslinking reaction takes place, thereby producing the enhanced SAP. However, when using glycerine carbonate as esterification agent, the addition of greater than 3 g of water per 100 g base polymer does not result in continued enhancement of the SAP's absorbing properties as is the case with ethylene carbonate. This suggests that the rate of glycerine carbonate hydrolysis may not be as steeply dependent on water concentration as is the case for ethylene carbonate. Thus, the performance of SAPs modified using glycerine carbonate as esterification agent was found to be virtually independent of the amount of water used in the formulation. In some cases, the presence of catalyst was seen to provide a measurable enhancement of the SAP's absorbing properties relative to formulations that did not contain catalyst.

Method 4

A homogeneous solution consisting of 1.50 grams glycerine, 2.99 grams water, and 0.50 grams zinc acetate was prepared and added to 50.00 grams of dry crosslinked poly(acrylic acid) (courtesy Industrial Chemicals). This starting polymer was prepared employing a trimethylolpropane triacrylate crosslinking agent. Approximately 70% of the acrylic acid moieties existed as the sodium salt, giving the polymer a pH similar to that of human skin. The resulting mixture was homogenized via mixing in a 300 cc household Black and Decker, HandyShortcut II chopper for 30–45 seconds. The homogenized mixture was then placed in a half-pint wide-mouth glass jar and subjected to a temperature of 145° C. for 2.5 hours with the lid removed. The hot, dry powder obtained was then removed from the oven, sealed with lid, and allowed to cool. The cooled material was then broken into small granules, again using the chopper, to yield the finished product. The above procedure was used to prepare example 29, and may be used to prepare the materials for which conditions are specified in all of examples 29–48, using a desired esterification agent.

The following tables III, IV, and V detail the formulations in which various esterification agents (referred to as "EA") were used to modify the crosslinked polymer starting material. Polymer performance is presented in terms of AAP with units of grams of saline solution absorbed per gram of SAP.

Generally speaking, we consider an AAP value of 28 to be a minimum requirement, while values in the range of 30–31 are typical of commercially available products. For instance, the AAP of the commercially available product AP70 (courtesy Stockhausen) was measured as detailed above and found to be 31.53. Conversely, the AAP of the base polymer used (courtesy Industrial Chemicals) without modification was found to be 16.29. Therefore, it can be stated that a goal of the modification was to increase the AAP of the base polymer from 16.29 to a value near or better than 31.53. Formulations that satisfy this goal are considered to be the most industrially attractive methods for preparing these materials, although the scope of the present invention is not limited by such factor.

TABLE III

| | Amt. (g) per 100 g polymer | | | | |
|---|---|---|---|---|---|
| Example | Glycerine | Water | Catalyst | Type Catalyst Used | AAP |
| 29 | 3.01 | 5.97 | 1.01 | Zinc Acetate | 28.11 |
| 30 | 3.00 | 3.00 | 0 | None | 33.52 |
| 31 | 3.00 | 6.03 | 0 | None | 30.52 |
| 32 | 3.01 | 1.02 | 0 | None | 30.72 |
| 33 | 3.03 | 0 | 0 | None | 31.88 |
| 34 | 1.00 | 3.00 | 0 | None | 24.04 |
| 35 | 3.00 | 6.07 | 1.00 | PEG, hydroxy-term.[a] | 23.20 |
| 36 | 3.03 | 5.98 | 0.96 | PEG, methoxy-term.[b] | 33.36 |
| 37 | 3.02 | 5.99 | 1.00 | Sodium acetate | 24.55 |
| 38 | 3.02 | 6.12 | 0.99 | 18-crown-6 | 30.35 | examples 29–38, glycerine used as esterification agent.
[a]Poly(ethylene glycol), hydroxy terminal groups, Mw~1500
[b]Poly(ethylene glycol), methoxy terminal groups, Mw~1000

TABLE IV

| | Amt. (g) per 100 g polymer | | | | |
|---|---|---|---|---|---|
| Example | GC | Water | Catalyst | Type Catalyst Used | AAP |
| 39 | 0.99 | 3.00 | 0 | None | 26.36 |
| 40 | 2.94 | 2.99 | 0 | None | 29.63 |
| 41 | 2.98 | 5.99 | 0 | None | 28.90 |
| 42 | 3.00 | 1.00 | 0 | None | 23.94 |
| 43 | 2.98 | 0 | 0 | None | 20.35 |
| 44 | 2.99 | 5.99 | 1.00 | PEG, methoxy-term.[a] | 29.80 |
| 45 | 2.98 | 5.99 | 1.01 | Zinc acetate | 23.10 |
| 46 | 3.00 | 5.99 | 0.99 | 18-crown-6 | 32.11 |
| 47 | 3.01 | 6.06 | 1.01 | Sodium acetate | 32.42 |
| 48 | 3.02 | 5.99 | 0.98 | PEG, hydroxy-term.[b] | 29.05 | examples 39–48, glycerine carbonate ("GC") used as esterification agent
[a]defined above
[b]defined above

TABLE V examples 49–56, various other esterification agents.

| | Amt. (g) per 100 g polymer | | | | |
|---|---|---|---|---|---|
| Example | TA | Water | Catalyst[a] | Transesterification Agent (TA) used | AAP |
| 49 | 3.05 | 5.02 | 1.00 | Dicarbamate, 2EC + EDA[b] | 21.10 |
| 50 | 3.01 | 5.01 | 0.99 | Dicarbamate, 2EC + TEGDA[c] | 21.96 |
| 51[d,e] | 3.03 | 3.00 | 0.99 | 4-methyl-1,3-dioxan-2-one | 20.58 |
| 52 | 3.01 | 3.01 | 0.99 | Diethylene glycol | 22.56 |
| 53[d] | 1.98 | 2.96 | 0.99 | 4-butyl-4-ethyl-1,3-dioxan-2-one | 18.59 |
| 54[d] | 2.01 | 2.99 | 1.02 | 4-isopropyl-5,5-dimethyl-1,3-dioxan-2-one | 19.39 |
| 55 | 3.01 | 3.00 | 0 | Carbamate, EC + DEA[f] | 24.35 |
| 56 | 3.01 | 3.01 | 0 | Carbamate, PC + DEA[g] | 25.83 |

[a]The catalyst used in all cases was poly(ethylene glycol), methoxy terminal groups, Mw~1000.
[b]Dicarbamate of ethylene carbonate (EC) and ethylene diamine (EDA):

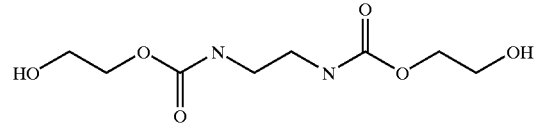

[c]Dicarbamate of EC and triethylene glycol diamine (TEGDA):

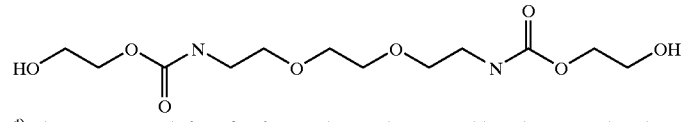

[d]A homogeneous solution of active, catalyst, and water could not be prepared as the esterification agent is water-insoluble. In these cases, a mixture of water and catalyst was added to the dry polymer followed by the neat, liquid esterification agent.
[e]The final product had a foul odor presumed to result from the degradation of the cyclic carbonate active to an unsaturated alcohol.
[f]Carbamate of EC and diethanolamine (DEA):

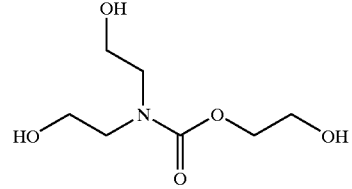

[g]Carbamate of propylene carbonate (PC) and DEA:

TABLE V-continued examples 49–56, various other esterification agents.

Amt. (g) per 100 g polymer

| Example | TA | Water | Catalyst[a] | Transesterification Agent (TA) used | AAP |
|---------|----|----|----|----|----|

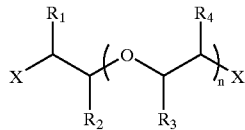

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

What is claimed is:

1. A process for providing an esterified copolymer useful as an absorbent comprising the steps of:
    a) providing a copolymer having an esterifiable acid group;
    b) providing water;
    c) providing a esterification agent; providing a catalyst, wherein said catalyst is a polyether of the formula $$X\!-\!\underset{R_2}{\overset{R_1}{C}}\!-\!\left(\!O\!-\!\underset{R_3}{\overset{R_4}{C}}\!\right)_{\!n}\!\!X$$

wherein X may be selected from the group consisting of: hydroxy and $C_1$–$C_6$ alkoxy, straight chain or branched; and $R_1$, $R_2$, $R_3$, and $R_4$ are each independently selected from the group consisting of: hydrogen, methyl, and ethyl; and n is any integer between 9 and 15,000;
   e) mixing said copolymer, water, esterification agent, and catalyst to form a mixture; and
   f) heating said mixture to a temperature sufficient to cause esterification of said esterifiable acid group with said esterification agent.

2. A process according to claim 1 wherein said copolymer is selected from the group consisting of: copolymers of acrylic acid and trimethylolpropane triacetate; and crosslinked acrylate based-polymers.

3. A process according to claim 1 wherein said mixture is heated to any temperature in the range of 80° to 150° Centigrade, including every degree therebetween, for at least ½ hour.

4. A process according to claim 1 wherein said mixture is heated to any temperature in the range of 80° to 150° Centigrade, including every degree therebetween, for a time period between 1 and 3 hours.

5. A process according to claim 1 wherein said esterification agent is any alkylene carbonate selected from the group consisting of: ethylene carbonate, propylene carbonate, butylene carbonate, and glycerine carbonate, including mixtures thereof.

6. A process according to claim 1 wherein the amount of esterification agent in said mixture is any amount between 0.50% and 5.00% by weight based upon the total weight of polymer in said mixture.

7. A process according to claim 1 wherein water is present in any amount between 0.50% and 10.00% by weight based upon the total weight of polymer in said mixture.

8. A process for providing an esterified copolymer useful as an absorbent comprising the steps of:
    a) providing a copolymer having an esterifiable acid group;
    b) providing water;
    c) providing an esterification agent;
    d) providing a catalyst selected from the group consisting of: an inorganic carbonate salt, an inorganic bicarbonate salt, an inorganic iodide salt, an inorganic hydroxide, acetate salts, and alkoxide salts which form a $C_1$–$C_6$ alcohol when mixed with water;
    e) mixing said copolymer, water, esterification agent, and catalyst to form a mixture; and
    f) heating said mixture to a temperature sufficient to cause esterification of said esterifiable acid group with said esterification agent.

9. A process according to claim 8 wherein the catalyst is an alkoxide salt, and wherein said alkoxide salt includes an alkali metal as one of the ions in said salt.

10. A process according to claim 8 wherein the catalyst is selected from the group consisting of: sodium carbonate, potassium carbonate, lithium carbonate, sodium bicarbonate, potassium bicarbonate, lithium bicarbonate.

11. A process according to claim 8 wherein the catalyst is an inorganic iodide salt selected from the group consisting of: sodium iodide, potassium iodide, and lithium iodide.

12. A process according to claim 8 wherein the catalyst is an inorganic hydroxide selected from the group consisting of: lithium hydroxide, sodium hydroxide, potassium hydroxide, calcium hydroxide, magnesium hydroxide, and strontium hydroxide.

13. A process according to claim 8 wherein said catalyst is selected from the group consisting of: zinc acetate, potassium acetate, and sodium acetate.

14. A process according to claim 1 wherein the amount of catalyst in said mixture is any amount between 0.05% and 3.00% by weight based upon the total weight of polymer in said mixture.

15. A process according to claim 1 wherein said reaction mixture further comprises an alcohol selected from the group consisting of: ethanol, n-propanol, isopropanol, n-butanol, and sec-butanol.

16. A process according to claim 1 wherein said esterification agent is glycerine, and is present in said mixture in any amount between 0.50 percent and 5.00 percent, including every hundredth percentage therebetween, by weight based upon the weight of said copolymer, and in which said mixture is heated to any temperature in the range of between 80° and 300° C., including every degree therebetween, for any amount of time in the range of 60 minutes to 180 minutes, including every minute therebetween.

17. A process as in claim 16 wherein the amount of water present is any amount between 0.50% and 10.00% by weight based upon the weight of said copolymer.

18. A process according to claim 16 wherein said the temperature range is between 130° C. and 150° C. and wherein the time range is between 120 minutes and 160 minutes.

19. A process for providing an esterified copolymer useful as an absorbent comprising the steps of:

a) providing a copolymer having an esterifiable acid group;

b) providing a esterification agent which comprises glycerine;

c) providing a catalyst, wherein said catalyst is a polyether of the formula

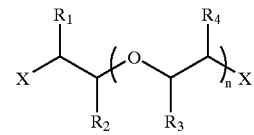

wherein X may be selected from the group consisting of: hydroxy and $C_1$–$C_6$ alkoxy, straight chain or branched; and $R_1$, $R_2$, $R_3$, and $R_4$ are each independently selected from the group consisting of: hydrogen, methyl, and ethyl; and n is any integer between 9 and 15,000;

d) mixing said copolymer, esterification agent, and catalyst to form a mixture; and e) heating said mixture to any temperature in the range of 80° C. to 300° C., including every degree therebetween, for at least 30 minutes to cause esterification of said esterifiable acid group with said esterification agent.

* * * * *